United States Patent
Oyman

(10) Patent No.: US 11,652,862 B2
(45) Date of Patent: May 16, 2023

(54) IMMERSIVE TELECONFERENCING AND TELEPRESENCE

(71) Applicant: Apple Inc., Cupertino, CA (US)

(72) Inventor: Ozgur Oyman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/892,019

(22) Filed: Aug. 19, 2022

(65) Prior Publication Data

US 2022/0417308 A1 Dec. 29, 2022

Related U.S. Application Data

(63) Continuation of application No. 17/439,322, filed as application No. PCT/US2020/039512 on Jun. 25, 2020, now Pat. No. 11,528,312.

(60) Provisional application No. 62/866,488, filed on Jun. 25, 2019.

(51) Int. Cl.
*H04L 65/65* (2022.01)
*H04L 65/1104* (2022.01)
*H04L 65/1016* (2022.01)
*H04L 65/403* (2022.01)

(52) U.S. Cl.
CPC .......... *H04L 65/65* (2022.05); *H04L 65/1016* (2013.01); *H04L 65/1104* (2022.05); *H04L 65/403* (2013.01)

(58) Field of Classification Search
CPC . H04L 65/65; H04L 65/1104; H04L 65/1016; H04L 65/403
See application file for complete search history.

(56) References Cited

U.S. PATENT DOCUMENTS

| 9,479,732 | B1 * | 10/2016 | Saleh | H04N 5/232 |
| 2015/0049004 | A1 * | 2/2015 | Deering | H04N 13/344 345/8 |
| 2017/0193711 | A1 * | 7/2017 | Lenchner | G06F 3/017 |
| 2022/0174108 | A1 | 6/2022 | Oyman et al. | |

OTHER PUBLICATIONS

[No Author Listed], "3rd Generation Partnership Project; Technical Specification Group Services and System Aspects; 3GPP Virtual reality profiles for streaming applications (Release 15)," 3GPP TS 26.118, V 15.1.9, Dec. 2018, 69 pages.

[No Author Listed], "3rd Generation Partnership Project; Technical Specification Group Services and System Aspects; IP Multimedia Subsystem (IMS); Multimedia Telephony; Media handling and interaction (Release 16)," 3GPP TS 26.114. V 16.2.0. Jun. 2019, 414 pages.

(Continued)

*Primary Examiner* — Normin Abedin
(74) *Attorney, Agent, or Firm* — Fish & Richardson P.C.

(57) ABSTRACT

Embodiments may relate to a user equipment (UE) that is configured to determine a real-time transport protocol (RTP) media flow that includes visual data related to a plurality of images concurrently taken of a location and a supplemental information enhancement (SEI) message that is to be used to display at least a portion of the visual data. The UE is further configured to visually display, based on the visual data and the SEI message, the portion of the visual data to a user of the user device. Other embodiments may be described or claimed.

20 Claims, 7 Drawing Sheets

(56) References Cited

OTHER PUBLICATIONS

[No Author Listed], "3rd Generation Partnership Project; Technical Specification Group Services and System Aspects; Telepresence using the IP Multimedia Subsystem (IMS); Media Handling and Interaction (Release 16)," 3GPP TS 26.223 V16.0.0, Mar. 2019, 41 pages.

[No Author Listed], "Information technology—Coded representation of immersive media—Part 2: Omnidirectional media format," International Standard ISO/IEC 23090-2, Jan. 2019, 170 pages.

[No Author Listed], "Information Technology—Coding of audo-visual objects—Part 10: Advanced Video Coding," Internatonal Organization for Standardzation/Internatonal Electrotechnical Commission (ISO/IEC). ISO/IEC 14496-10, Oct. 1, 2004, 280 pages.

[No Author Listed], "Information Technology13 High efficiency coding and media delivery in heterogeneous environments—Part 2; High efficiency video coding," International Organization for Standardization/International Electrotechnical Commission (ISO/IEC) standard 23008-2. Oct. 2017, 812 pages.

[No Author Listesd], "3rd Generation Partnership Project; Technical Specification Group Servies and System Aspects; Study on media handling aspects of conversational services in 5G systems (Release 16)," 3GPP TR 26.919 V16.1.0, Mar. 2019, 23 pages.

Huawei Technologies Co. Ltd. et al., "Proposed updates to TR 26.919 on various aspects," 3GPP TSG-SA4 Meeting #99. S4-180650, Rome, Italy, Jul. 9-13, 2018, 7 pages.

Intel et al., "ITT4RT Permanent Document—Requirements. Working Assumptions and Potential Solutions," 3GPP TSG-SA4 Meeting #103, S4-190503, Newport Beach, CA, U.S.A., Apr. 8-12, 2019, 6 pages.

International Preliminary Report on Patentability in International Appln. No. PCT/US2020/039512, dated Jan. 6, 2022, 10 pages.

International Search Report and Written Opinion in International Appln. No. PCT/US2020/039512, dated Sep. 14, 2020, 16 pages.

Wang et al., "RTP Payload Format for H.264 Video," Internet Engineering Task Force (IETF), RFC 6184, May 2011, 101 pages.

Wang et al., "RTP Payload Format for High Efficiency Video Coding (HEVC)," Internet Engineering Task Force (IETF), RFC 7798, Mar. 2016, 86 pages.

* cited by examiner

IMMERSIVE TELECONFERENCING AND TELEPRESENCE

CROSS-REFERENCE TO RELATED APPLICATION

This application is a continuation of U.S. patent application Ser. No. 17/439,322, filed Sep. 14, 2021, which is a U.S. National Phase application under 35 U.S.C. § 371 of International Patent Application No. PCT/US2020/039512, filed on Jun. 25, 2020, which claims the benefit of the priority of U.S. Provisional Patent Application No. 62/866,488, filed on Jun. 25, 2019, the disclosures of each of which are incorporated herein by reference in their entirety.

BACKGROUND

Telepresence and teleconference is becoming more ubiquitous as cellular bandwidths increase. In some use cases, multiple users may join a meeting from a remote location via a user equipment (UE) such as a cellular phone, a tablet, a headset, or some other device.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

Figure 1:
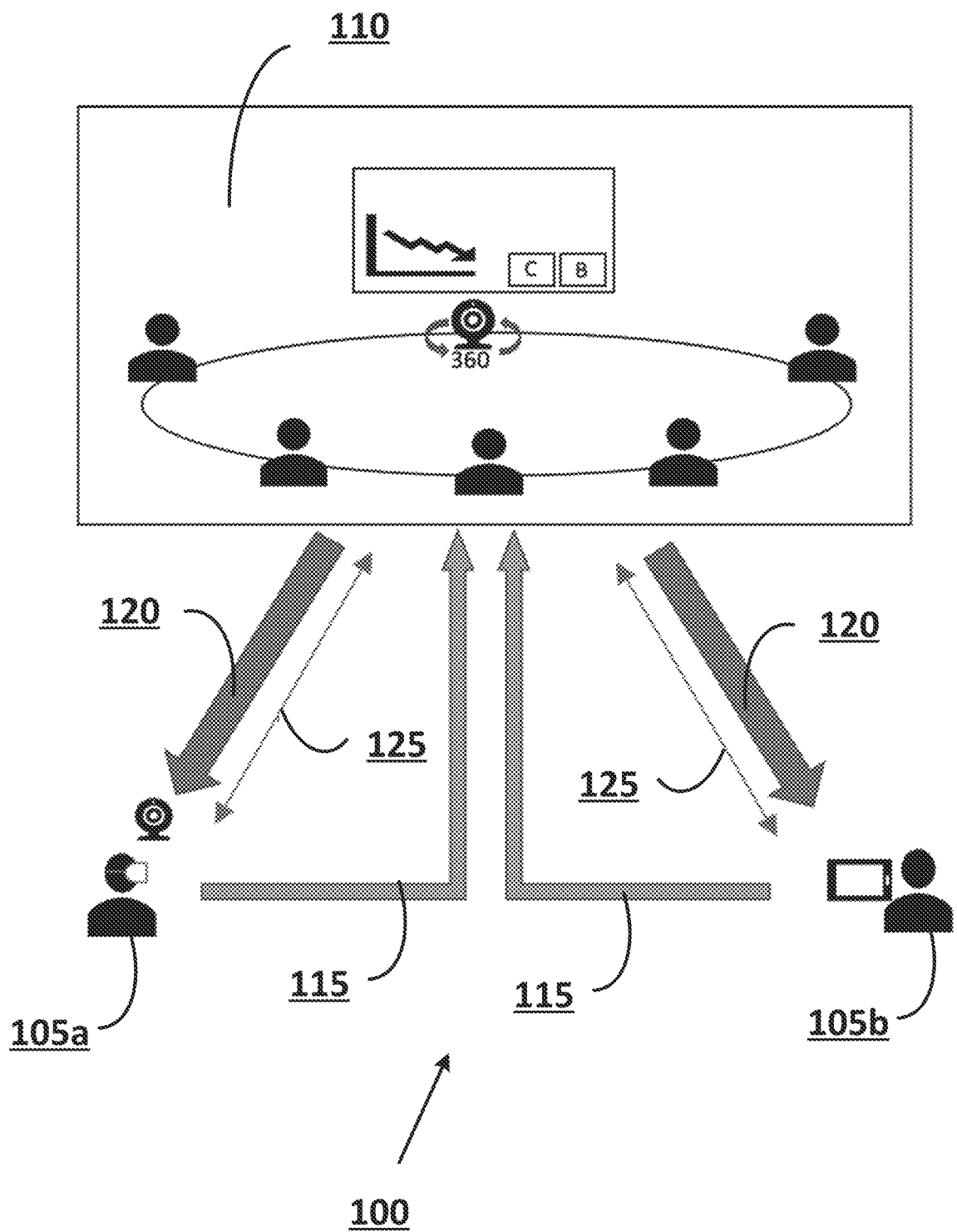
FIG. 1 depicts a simplified architecture related to a first example use case of various embodiments herein.

Generally, embodiments herein relate to SDP-based and Real-time Transport Protocol (RTP)-based procedures to support immersive teleconferencing and telepresence. For example, embodiments may relate to SDP procedures to negotiate immersive media exchange capabilities. Embodiments herein may provide a number of benefits such as simplification of interoperability and SDP handling FIG. 1 depicts a simplified architecture 100 related to a first example use case of embodiments herein. It will be noted that this use case is described with respect to a conference call with two remote individuals 105a and 105b, however in other embodiments the architecture may include more or fewer individuals. Specifically, in FIG. 1, a group of colleagues may be having a meeting in conference room 110. The room may include a conference table (for physically present participants), a camera, and a view screen. For the purposes of this disclosure, the camera will be described as being a "360-degree camera" which is able to capture video in a full 360 degree view field around the camera. Specifically, the camera may include a plurality of individual cameras or lenses which are able to capture video at different angles or fields of view relative to the camera. However, it will be recognized that in other embodiments the camera may not be a full 360-degree camera, but rather may be configured to capture a smaller field of view than a full 360-degree field of view.

Two other individuals at 105a and 105b may not be in the same location as the conference room 110, and may wish to join the meeting through a conference call. For example, participants in the conference room 110 may use the screen to display a shared presentation and/or video streams coming from individuals 105a and 105b. In this example use case, individual 105a may join the video conference from a remote location such as their home using a UE with a Head Mounted Display (HMD) and a camera that captures their video. Individual 105a may enjoy a 360-degree view of the conference room 110 by, for example, turning their head. Individual 105b may join the conference from a remote location such as an airport using a UE such as a mobile phone. Individual 105b may also enjoy a 360-degree view of the conference room on the screen of their mobile phone by turning the phone, and may further use their mobile camera for capturing his own video.

In this use case, individuals 105a and 105b may be able to see the screen in the conference room 110 as part of the 360-degree video. They may also have the option to bring into focus one or more of the various incoming video streams (e.g., presentation or the other remote participant's camera feed) using their own display devices.

Generally, the above-described use case can be realized in two possible configurations. The first configuration is as described above with respect to FIG. 1. In this configuration, communication between the conference room 110 and the various individuals 105a and 105b (or other individuals which may join using one or more UEs) may be set up without the support of media-aware network elements such as a conference server. In this embodiment, communication such as audio or video may be transmitted directly between the conference room 110 and the individuals 105a/105b by way of a conversational audio/video stream 125. Specifically, the conversational audio or video stream may provide audio or visual data (for example, of an individual 105a or 105b) between the conference room and the UE of the individuals 105a/105b.

Additionally, the individuals 105a/105b may provide viewport-related information 115 to the conference room 110, which in turn may provide a viewport-dependent audio or video stream at 120. As used herein, the term "viewport" may relate to a field of view of the conference room 110 as displayed by a UE. For example, the term "viewport" may relate to a zoom-level, a specific orientation, etc. of the conference room 110. More specifically, an individual such as individuals 105a/105b may change their viewport through a variety of mechanism such as interaction with the UE (e.g., swiping on touch screen of the UE or some other interaction), rotation of the UE, a command such as a verbal command, a gesture, etc. This change may be communicated via the viewport-related information 115. In response, the viewport-dependent audio or video stream 120 may be altered to include a corresponding change to the video information provided to the UEs of individuals 105a/105b such as the field of view, the zoom level, stereo-aspects of the audio stream, etc.

Figure 2:
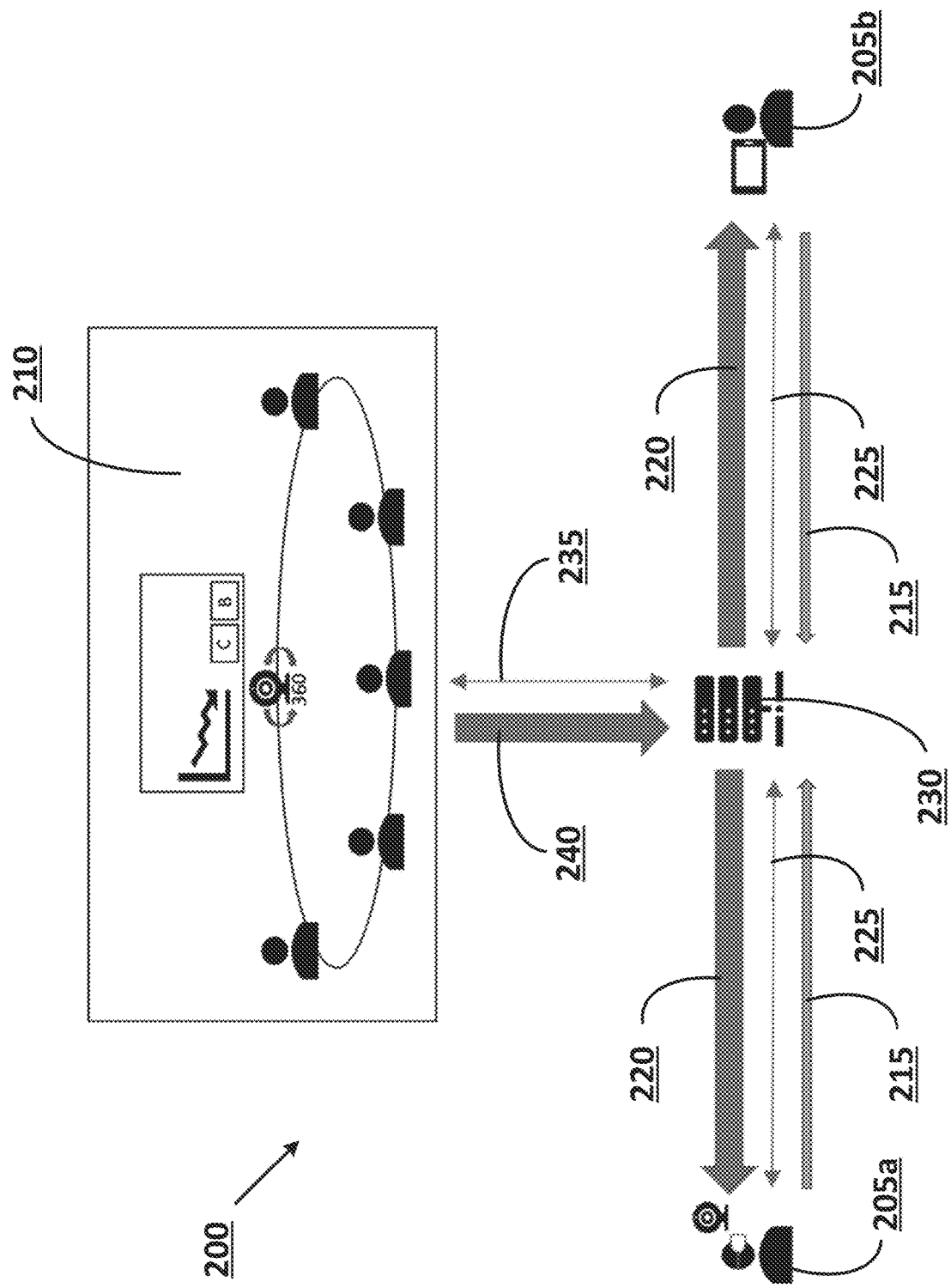
FIG. 2 depicts a simplified alternative architecture related to a second example use case of various embodiments herein.

FIG. 2 depicts a simplified alternative architecture 200 related to a second example use case of various embodiments herein Similarly to architecture 100, the architecture 200 may include a conference room 210 and individuals 205a/205b, which may be similar to conference room 110 and individuals 105a and 105b. In the second scenario, the call is setup using a network function, which may be performed by either a Media Resource Function (MRF) or a Media Control Unit (MCU). Specifically, the MRF/MCU may be provided by a conference server 230 which may be communicatively located between the individuals 205a/205b and the conference room 210. In some embodiments, the conference server 230 may be an internet protocol (IP) multimedia subsystem (IMS) server that is operable to provide MRF or MCU functionality.

In this example use case, the server 230 may receive a viewport-independent stream 240 from the conference room 210. Specifically, the server 230 may receive audio or visual data that is not based on a specific viewport orientation. The server 230 may also be communicatively coupled with the conference room 210 to provide a conversational audio or visual data stream 235 which may be generally similar to the streams 125 described above with respect to FIG. 1.

The server 230 may further be communicatively coupled with individuals 205a and 205b, via data streams such as a viewport-dependent stream 220, viewport-related information 215, and a conversational audio/video stream 225 which may be respectively similar to viewport-dependent stream 120, viewport-related information 115, and conversational audio/video stream 125.

Typically, the use case of architectures 100 or 200 may enable an immersive experience for individuals 205a/205b joining teleconferencing and telepresence sessions, with two-way audio and one-way immersive video, e.g., a remote user wearing an HMD participating in a conference may send audio and optionally 2D video (e.g., of a presentation, screen sharing and/or a capture of the user itself), but receives stereo or immersive voice/audio and immersive video captured by an omnidirectional camera in a conference room connected to a fixed network.

It will be understood that these architectures are example architectures, and other embodiments may include aspects of both architectures, or additional aspects. For example, in some embodiments an individual's UE may be directly coupled with the conference room while another individual's UE may be communicatively coupled with a server. In some embodiments, an individual's UE may be communicatively coupled with a server for viewport-related information, while the individual's UE may be coupled directly with the conference room for a conversational audio or visual data stream. It will also be understood that, as used herein, the concept of "coupled with the conference room" is used to describe a communicative coupling with, for example, a server or other electronic device that is providing or receiving audio or visual data from a speaker or camera of the conference room.

The architectures 100 or 200 may have a number of example features. One such feature may be that multiple single-user participants such as individuals 105a/105b/205a/205b may be allowed. Communications between the single users may be structured as multimedia telephony service for IMS (MTSI) or Telepresence communications as defined by third generation partnership project (3GPP) specifications. In other embodiments, the communications may be structured as multi-stream MTSI (MSMTSI). In embodiments where MSMTSI is used, then media data may be transmitted in separate media streams.

Another such feature may be the presence of a single 360-degree camera per location in multi-party conference scenarios (e.g., in respective ones of the conference rooms 110 or 210) involving multiple physical locations. As noted, the camera may take a number of two-dimensional images. The images may then be "stitched" together, or combined, into an image with a broader (e.g., 360-degree) field of view. Various embodiments may use in-camera stitching, wherein the images are stitched together by the camera itself, or network-based stitching, wherein the images are stitched together by a server such as server 230.

In the case of camera stitching, stitched immersive video may sent from the conference room 210 to the server, for example in viewport-independent stream 240, and then from the server 230 to the individuals 205a or 205b, e.g. through the viewport-dependent stream 220, the conversational audio/video stream 225, or both. If the use case is a one-to-one conversational session between the conference room 210 and the user (e.g., individuals 105a/105b/205a/205b), a server such as server 230 which may act as a media gateway may not be necessary.

In the use case of network-based stitching, the various two-dimensional images may be sent from the conference room 210 to the server 230, for example in viewport-independent stream 240. The server may perform decoding, stitching, and re-encoding of the images to produce the immersive video (e.g., the video or image with the larger field of view), which is then distributed to the remote participants as described above.

In some embodiments, it may be desirable for various elements of the architectures 100 or 200 such as the camera or electronics in the conference rooms 110/210, UEs of the individuals 105a/105b/205a/205b, or server 230 to support MTSI or IMS telepresence codec, protocol, or transport capabilities relevant for encoding, delivery, and consumption of immersive speech/audio and immersive video. It may also be desirable for elements such as the camera or electronics of the conference rooms 110 or 210, or the server 230 to be able to send viewport-dependent streams, viewport-independent streams, or both. It may also be desirable to structure the architecture such that changes in viewport orientation are delivered, and the relevant viewport-dependent streams are updated, in such a manner as to reduce or eliminate latency-prone signaling, such as SIP renegotiations. It may also be desirable for the architecture to establish a suitable coordinate system to be used as the standard way of communicating the orientation of the viewport between various elements of the architectures 100 or 200.

Figure 4:
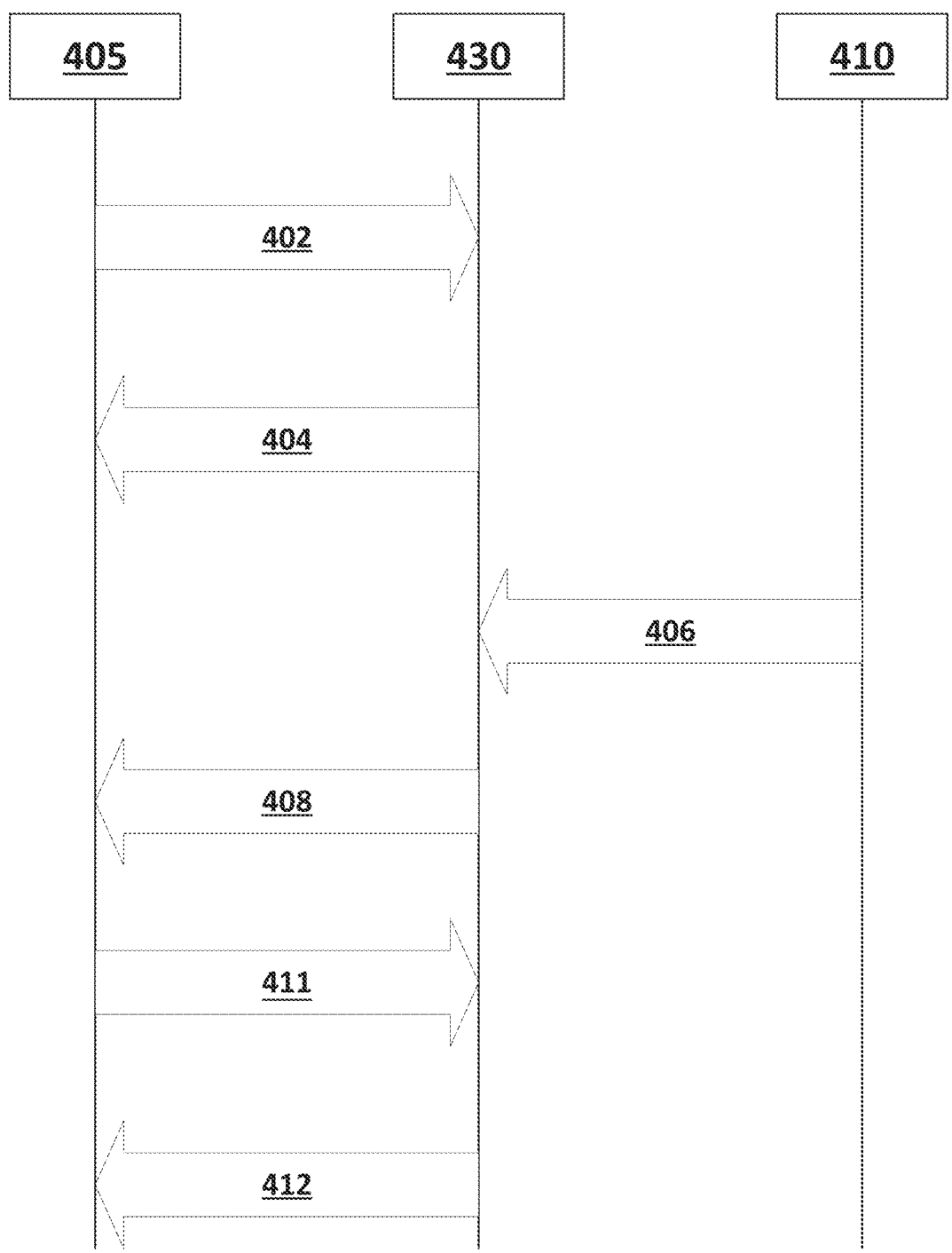
FIG. 4 depicts an example process flow related to embodiments herein.

Generally, embodiments herein may include aspects or elements similar to the MTSI service architecture depicted in FIG. 4.1 of the 3GPP technical specification (TS) 26.114 v16.2.0 (June, 2019) for immersive teleconferencing. Further, the following may be observed.

For in-camera stitching, stitched immersive video may be sent from the conferencing room to the conferencing server (e.g., MSMTSI MRF) or directly to the remote participant (e.g., one-to-one conversation) in one or more RTP streams (e.g., established via SDP). Multiple RTP streams may be used in case tile or sub-picture based delivery optimization is in use. In these embodiments, the RTP streams may be, for example, the viewport-dependent streams 120/220, or the viewport-independent stream 240 of FIG. 1 or 2.

For network-based stitching, multiple RTP streams may be established (e.g., via SDP, using MSMTSI) between the conferencing server and conference room, e.g. as multiple viewport-independent streams 240, each of which may carry a particular two-dimensional image or video capture. These RTP streams may then be sent from the conference room to the conferencing server and the conferencing server may perform decoding, stitching, and re-encoding to produce one or more RTP streams containing the immersive video, which are then distributed to the remote participants (e.g., again via MSMTSI), for example in the viewport-dependent streams 220. Multiple RTP streams may be used for the immersive video in case tile or sub-picture based delivery optimization is in use.

Figure 3:
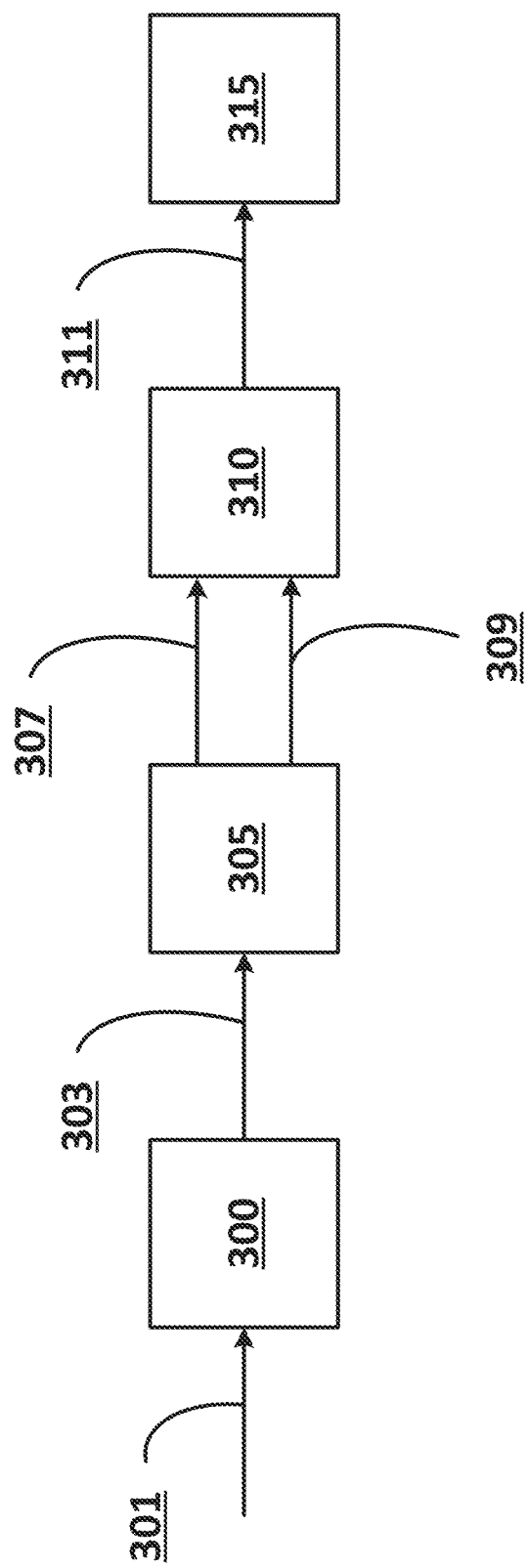
FIG. 3 depicts an overview of a possible receiver architecture, in accordance with various embodiments herein.

FIG. 3 depicts an overview of a possible receiver architecture, in accordance with various embodiments herein. Specifically, FIG. 3 provides an overview of a possible receiver architecture that reconstructs the spherical video in an MTSI or IMS Telepresence UE such as may be used by individuals 105a/105b/205a/205b/etc. It may be understood that FIG. 3 may not represent an actual implementation, but rather may be considered to depict a logical set of receiver functions. Generally, some or all of the elements of FIG. 3 may be implemented in a baseband receiver. In other embodiments, various of the elements may be implemented in or by a processor or element of a radio frequency (RF) transceiver, or elsewhere within the UE.

Initially, an RTP receiver 300 may receive one or more RTP streams 301. The RTP streams 301 may be as received from, for example, a server such as server 230 or a conference room such as conference rooms 110 or 210 as described above. More specifically, the one or more RTP streams 301 may be received in a viewport-dependent stream such as viewport-dependent streams 120 or 220. Based on the one or more received RTP streams 301, the RTP receiver 300 may parse, possibly decrypt, or other process the one or more RTP streams 301 to generate an elementary stream 303 which is provided to a high-efficiency video coding (HEVC) decoder 305. The HEVC decoder 305 may obtains the decoder output signal from the elementary stream 303. The decoder output signal may include image data which may be referred to herein as the "texture," 307. The HEVC decoder 305 may further obtain decoder metadata 309. The decoder metadata 309 may include one or more supplemental information enhancement (SEI) messages, e.g., information carried in the omnidirectional video specific SEI messages, to be used by the UE in the rendering phase. In particular, the decoder metadata 309 may be used by a texture-to-sphere mapping function 310 to generate a spherical video 311 (or part thereof) based on the decoded output signal, e.g., the texture 307. The viewport may then be generated by a viewport rendering module 315 from the spherical video signal 311 (or part thereof) by taking into account the viewport position information from sensors, display characteristics as well as possibly other metadata such as initial viewport information. The rendered signal may then be provided to a display of the UE such as a touchscreen, an eyepiece, or some other display such that the user of the UE may view the rendered image.

For 360-degree video, the potential solutions can consider one or more of the following principles. Specifically, the RTP stream 301 may contain an HEVC bitstream with omnidirectional video specific SEI messages. The omnidirectional video specific SEI messages may be similar to those defined in the International Organization for Standardization/International Electrotechnical Commission (ISO/IEC) standard 23008-2 (2017). The elementary stream 303 may be based on the Omnidirectional Media Format (OMAF) specification ISO/IEC 23090-2 (2019), clause 10.1.2.2.

Generally, the SEI messages in the elementary stream 303 with decoder rendering metadata may include various information. For example, the SEI message(s) may include region-wise packing information, e.g., carrying region-wise packing format indication and also any coverage restrictions. The SEI message(s) may further include projection mapping information, indicating the projection format in use, e.g., Equirectangular projection (ERP) or Cubemap projection (CMP). The SEI message(s) may further include information related to padding, e.g., whether there is padding or guard band in the packed picture. The SEI message(s) may further include information related to a frame packing arrangement, indicating the frame packing format for stereoscopic content. The SEI message(s) may further include content pre-rotation information, indicating the amount of sphere rotation, if any, applied to the sphere signal before projection and region-wise packing at the encoder side.

The output signal, e.g., the decoded picture or "texture" 307, may then be rendered using the decoder metadata information 309 related to the relevant SEI messages. The decoder metadata 309 may be used when performing rendering operations such as region-wise unpacking, projection de-mapping and rotation toward creating spherical content for each eye of a user (if desired).

In some embodiments, viewport-dependent processing may be supported for both point-to-point conversational sessions and multi-party conferencing scenarios. The viewport-dependent processing may be achieved by sending from the MTSI receiver (e.g., a UE of an individual such as individuals 105a/105b/205a/205b) RTP control protocol (RTCP) feedback or RTP header extension messages with the desired viewport information, for example in the viewport-related information 115 or 215. The corresponding viewport-dependent information may then be encoded and sent by the MTSI sender (e.g., at the conference room 110 in viewport-dependent stream 120) or by the server 230 (e.g., in viewport-dependent stream 220).

This process flow may deliver resolutions higher than a viewport-independent approach for the desired viewport.

Generally, viewport-dependent processing based on tiling and sub-picture coding may be based on RTP/RTCP based protocols that are supported by MTSI and IMS-based telepresence.

For achieving video quality which may be viewed as acceptable for a viewport-dependent virtual reality (VR) service, it may be desirable for the video codecs for VR support in MTSI and IMS telepresence to be aligned with OMAF, the 3GPP TS 26.118 v 15.1.0 (December, 2018), or both. It may be desirable for both MTSI client (as may be used by the UE) and MTSI gateway (as may be used by a server 230) codec requirements to be aligned with these recommended video codec requirements for VR support.

Procedures related to the negotiation of SEI messages for carriage of decoder rendering metadata may be similar to those described in the Internet Engineering Task Force (IETF) Request For Comment (RFC) 7798 (March, 2016) on the RTP payload format for HEVC. In particular the procedures may relate to exposing SEI messages related to decoder rendering metadata for omnidirectional media in the SDP using the 'sprop-sei' parameter, which may allow for the conveyance of one or more SEI messages that describe bitstream characteristics. When present, a decoder may rely on the bitstream characteristics that are described in the SEI messages for the entire duration of the session. In some embodiments, both MTSI clients and MTSI gateways may support RTP payload formats for VR support.

As noted, SEI messages may be present in the decoder metadata 309. The SEI messages may include one or more of: the equirectangular projection SEI message; the cubemap projection SEI message; the sphere rotation SEI message; and the region-wise packing SEI message. For stereoscopic video support, in either one-to-one video telephony scenarios or multi-party video conferencing scenarios, support of a subset of the frame packing arrangement SEI message may be desirable.

FIG. 4 depicts an example process flow related to embodiments herein. It will be understood that, for in-camera stitching, stitched immersive video may be sent from the conference room (e.g., conference rooms 110 or 210) to the server (e.g., server 230) or directly to the remote participant (e.g., to individuals 105*a*/105*b*/205*a*/205*b*) in one or more RTP streams (e.g., established via SDP) as described above. Additionally, in some embodiments, multiple RTP streams may be used in case tile or sub-picture based delivery optimization is in use.

There may be 3 communicative elements present in the process flow of FIG. 4. Specifically, the process flow may include a UE of an individual at 405, which may be similar to, for example, the UE of individuals 105*a*/105*b*/205*a*/205*b*/etc. The process flow may further include a server 430, which may be similar to, for example, server 230. The process flow may further include an electronic device at a conference room 410 which may be similar to, for example, conference rooms 110 or 210.

Initially, at 402, the UE at 405 may send an SDP offer to the server 430 indicating immersive media capabilities including 360-degree video support. In some embodiments, the UE at 405 may also include viewport-dependent processing capability in the SDP offer, e.g., based on various embodiments described herein. Two or more RTP streams may be included in the SDP offer at 402 in case viewport-dependent processing is offered, e.g. one RTP stream for the base 360-degree video and another viewport-optimized RTP stream, with the high quality 360-degree video corresponding to the desired viewport.

At 404, the server 430 may respond to the UE 405 with an SDP answer confirming immersive media capabilities of the server 430, including 360-degree video support. In some embodiments, the server 430 may also include an indication of viewport-dependent processing capability in the SDP answer at 404. In case viewport-dependent processing is accepted or included, the SDP answer from the server 430 may include multiple RTP streams.

At 406, the conference room 410 may provide viewport-independent information to the server 430, and then at 408 the server 430 may stream the RTP media flow with immersive media including 360-degree video to the UE at 405. 360-degree video transmission could be based on the RTP payload formats for HEVC that carry SEI messages In some embodiments, at 411, the UE at 405 may signal desired viewport information using a dedicated RTCP feedback message. In this embodiment, at 412, the server 430 may respond to UE 405. Information on the actually transmitted viewport may also be included in the RTP media flow. In case two RTP streams are negotiated, then the viewport-optimized RTP stream containing the high quality 360-degree video may contain this information.

It will be understood that this embodiment is intended as one example embodiment, and other embodiments may include more or fewer elements, elements in a different order than depicted, etc. It will also be understood that although elements herein are described as relating to 360-degree video, in other embodiments the media flows may be related to a narrower field of view as described above.

Figure 5:
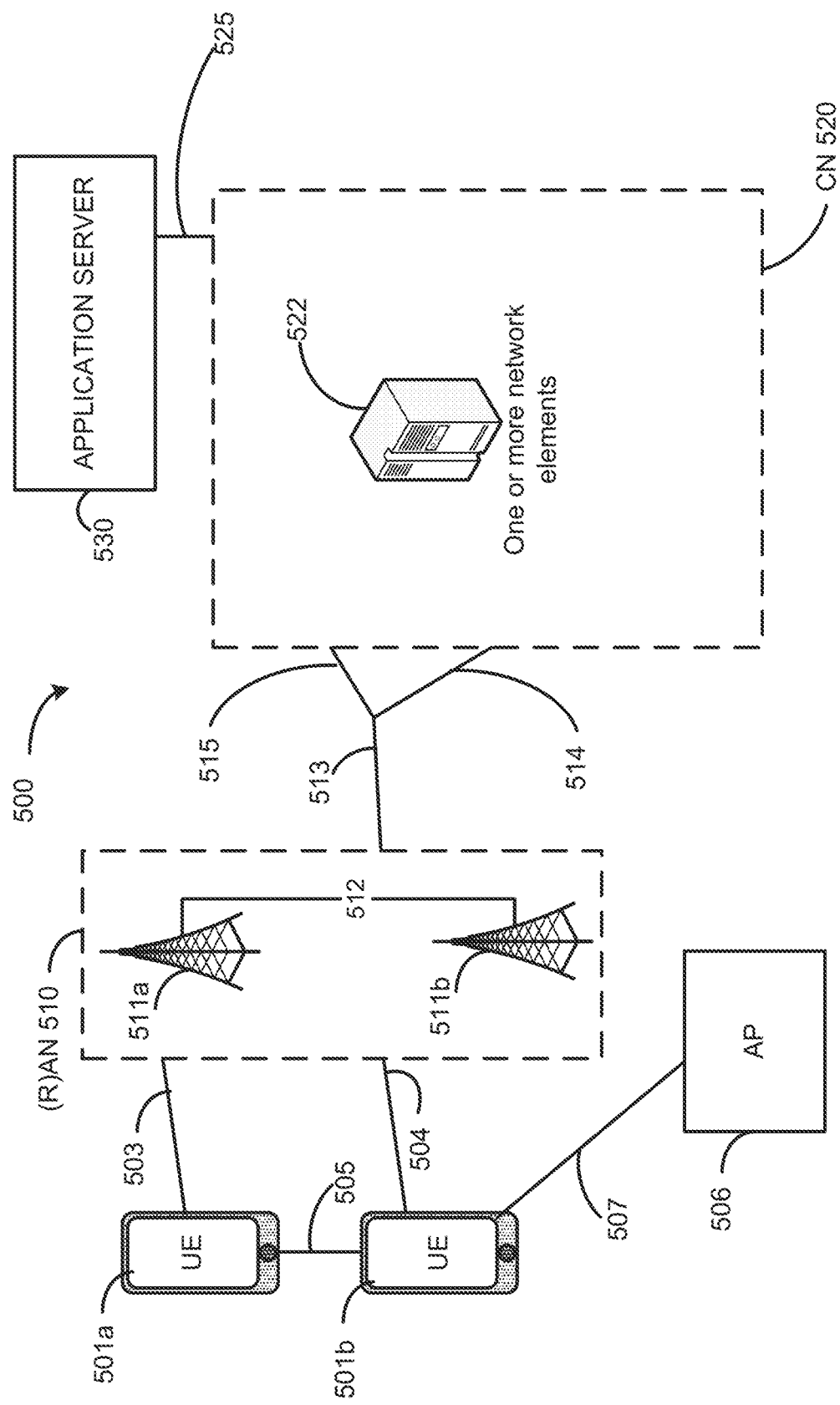
FIG. 5 illustrates an example architecture of a system of a network, in accordance with various embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 501*a* and UE 501*b* (collectively referred to as "UEs 501" or "UE 501"), which may be similar to, for example, the UEs of individuals 105*a*/105*b*/205*a*/205*c*, or the UE described at 405. In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501b is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501b, RAN 510, and AP 506 may be configured to utilize LWA operation and/or LWIP operation. The LWA operation may involve the UE 501b in RRC_CONNECTED being configured by a RAN node 511a-b to utilize radio resources of LTE and WLAN. LWIP operation may involve the UE 501b using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low-power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs, and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5GC via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with RF circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short-Range Communications (DSRC) band to provide very low latency communications required for high-speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501 and the RAN nodes 511 may operate using LAA, eLAA, and/or feLAA mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier-sensing operations may be performed according to a listen-before-talk (LBT) protocol.

LBT is a mechanism whereby equipment (for example, UEs 501 RAN nodes 511, etc.) senses a medium (for example, a channel or carrier frequency) and transmits when the medium is sensed to be idle (or when a specific channel in the medium is sensed to be unoccupied). The medium-sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs Similar to above, each ECCE may correspond to nine sets of four physical resource elements known as an EREG. An ECCE may have other numbers of EREGs in some situations.

The RAN nodes 511 may be configured to communicate with one another via interface 512. In embodiments where the system 500 is an LTE system (e.g., when CN 520 is an EPC), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on IP transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6:
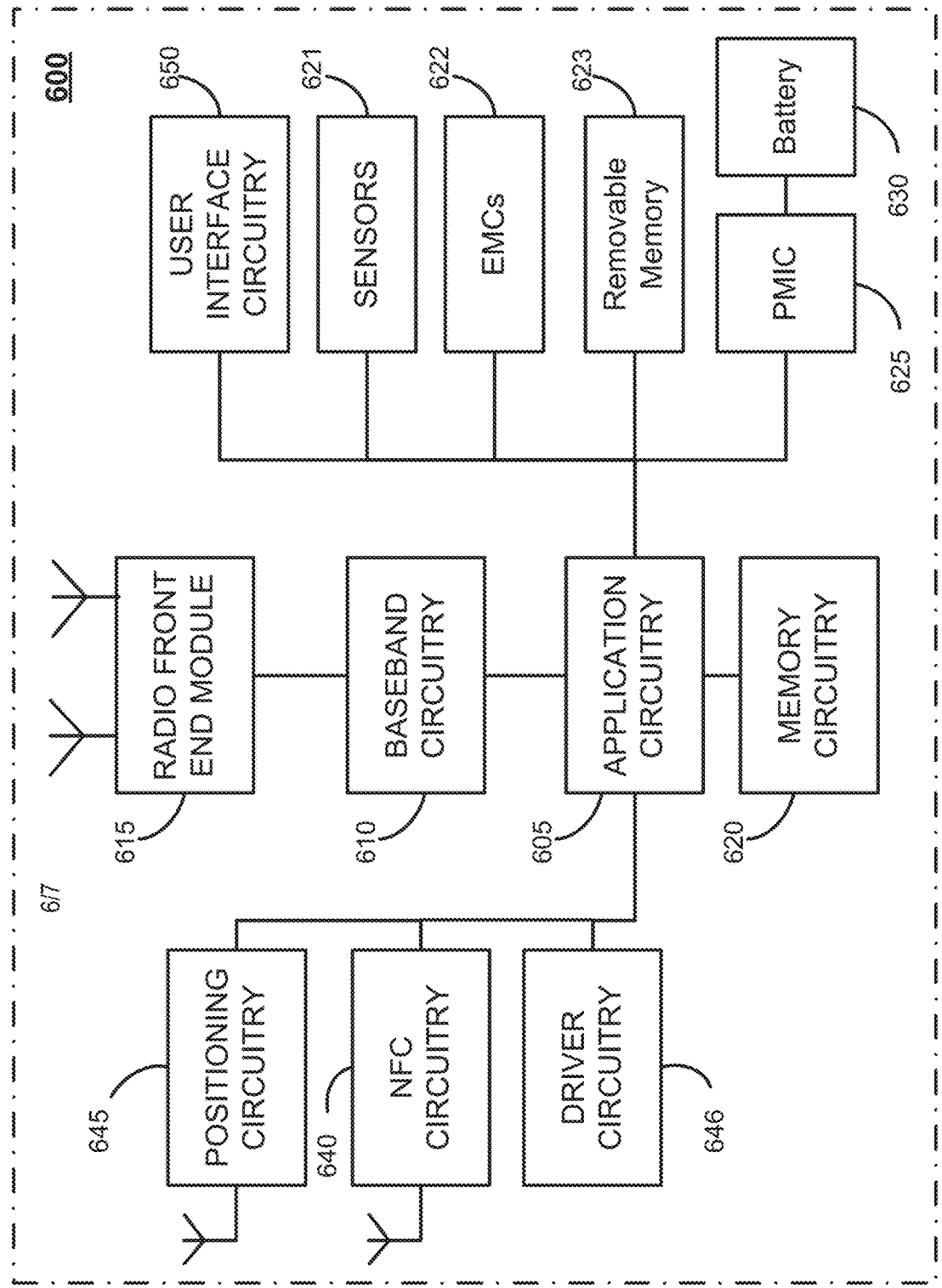
FIG. 6 illustrates an example of a platform (or "device") in accordance with various embodiments.

FIG. 6 illustrates an example of a platform 600 (or "device 600") in accordance with various embodiments. In embodiments, the computer platform 600 may be suitable for use as UEs 501, application servers 530, the UEs of individuals 105a/105b/205a/205b or at 405, or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

Application circuitry 605 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as Secure Digital (SD) MMC or similar, USB interfaces, MIPI interfaces, and JTAG test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, static random access memory (SRAM), erasable programmable read-only memory (EPROM), electrically erasable programmable read-only memory (EEPROM), flash memory, solid-state memory, and/or any other type of memory device technology, such as those discussed herein.

As examples, the processor(s) of application circuitry 605 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., EPROM, EEPROM, flash memory, static memory (e.g., SRAM, anti-fuses, etc.)) used to store logic blocks, logic fabric, data, etc. in look-up tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 7.

The RFEMs 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include any number and type of memory devices used to provide for a given amount of system memory. As examples, the memory circuitry 620 may include one or more of volatile memory including random access memory (RAM), dynamic RAM (DRAM) and/or synchronous dynamic RAM (SDRAM), and non-volatile memory (NVM) including high-speed electrically erasable memory (commonly referred to as flash memory), phase change random access memory (PRAM), magnetoresistive random access memory (MRAM), etc. The memory circuitry 620 may be developed in accordance with a Joint Electron Devices Engineering Council (JEDEC) low-power double data rate (LPDDR)-based design, such as LPDDR2, LPDDR3, LPDDR4, or the like. Memory circuitry 620 may be implemented as one or more of solder-down packaged integrated circuits, single die package, dual die package (DDP) or quad die package (Q17P), socketed memory modules, dual inline memory modules (DIMMs) including microDIMMs or MiniDIMMs, and/or soldered onto a motherboard via a ball grid array (BGA). In LP implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) crosspoint (XPOINT) memories from Intel® and Micron®.

Removable memory circuitry 623 may include devices, circuitry, enclosures/housings, ports or receptacles, etc. used to couple portable data storage devices with the platform 600. These portable data storage devices may be used for mass storage purposes, and may include, for example, flash memory cards (e.g., SD cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry include sensor circuitry 621 and electro-mechanical components (EMCs) 622, as well as removable memory devices coupled to removable memory circuitry 623.

The sensor circuitry 621 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 622 include devices, modules, or subsystems whose purpose is to enable platform 600 to change its state, position, and/or orientation, or move or control a mechanism or (sub)system. Additionally, EMCs 622 may be configured to generate and send messages/signaling to other components of the platform 600 to indicate a current state of the EMCs 622. Examples of the EMCs 622 include one or more power switches, relays including electro-mechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like EMCs. In embodiments, platform 600 is configured to operate one or more EMCs 622 based on one or more captured events and/or instructions or control signals received from a service provider and/or various clients.

In some implementations, the interface circuitry may connect the platform 600 with positioning circuitry 645. The positioning circuitry 645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-PNT IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., radio base stations), for turn-by-turn navigation applications, or the like In some implementations, the interface circuitry may connect the platform 600 with Near-Field Communication (NFC) circuitry 640. NFC circuitry 640 is configured to provide contactless, short-range communications based on radio frequency identification (RFID) standards, wherein magnetic field induction is used to enable communication between NFC circuitry 640 and NFC-enabled devices external to the platform 600 (e.g., an "NFC touchpoint"). NFC circuitry 640 comprises an NFC controller coupled with an antenna element and a processor coupled with the NFC controller. The NFC controller may be a chip/IC providing NFC functionalities to the NFC circuitry 640 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 640, or initiate data transfer between the NFC circuitry 640 and another active NFC device (e.g., a smartphone or an NFC-enabled POS terminal) that is proximate to the platform 600.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact with or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensor circuitry 621 and control and allow access to sensor circuitry 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in a UE 501.

In some embodiments, the PMIC 625 may control, or otherwise be part of, various power saving mechanisms of the platform 600. For example, if the platform 600 is in an RRC_Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC_Idle state, where it disconnects from the network and does not perform operations such as channel quality feedback, handover, etc. The platform 600 goes into a very LP state and it performs paging where again it periodically wakes up to listen to the network and then powers down again. The platform 600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 650 includes various input/output (I/O) devices present within, or connected to, the platform 600, and includes one or more user interfaces designed to enable user interaction with the platform 600 and/or peripheral component interfaces designed to enable peripheral component interaction with the platform 600. The user interface circuitry 650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 600. The output device circuitry may also include speakers or other audio emitting devices, printer(s), and/or the like. In some embodiments, the sensor circuitry 621 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 600 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 7:
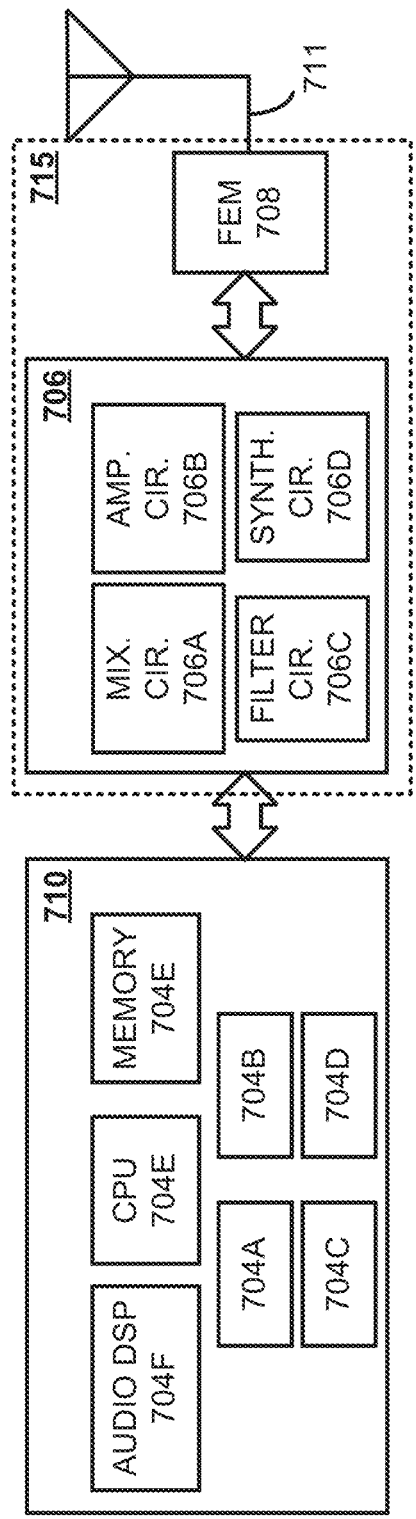
FIG. 7 illustrates example components of baseband circuitry and radio front-end modules (RFEM) in accordance with various embodiments.

FIG. 7 illustrates example components of baseband circuitry 710 and RFEM 715 in accordance with various embodiments. The baseband circuitry 710 corresponds to the baseband circuitry 610 of FIG. 6. The RFEM 715 corresponds to the RFEM and 615 of FIG. 6. As shown, the RFEMs 715 may include RF circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, RF shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 605 (see FIG. 6) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 605); an RF circuitry interface to send/receive data to/from RF circuitry 706 of FIG. 7; a wireless hardware connectivity interface to send/receive data to/from one or more wireless hardware elements (e.g., NFC components, Bluetooth®/Bluetooth® Low Energy components, Wi-Fi® components, and/or the like); and a power management interface to send/receive power or control signals to/from the PMIC 625.

In alternate embodiments (which may be combined with the above-described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or RF circuitry (e.g., the RFEM 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a SoC or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 605 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 605 depending on the desired output frequency. In some embodiments, a divider control input (e.g., N) may be determined from a look-up table based on a channel indicated by the application circuitry 605.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 605 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 605 may utilize data (e.g., packet data) received from these layers and further execute Layer 4 functionality (e.g., TCP and UDP layers). As referred to herein, Layer 3 may comprise a RRC layer. As referred to herein, Layer 2 may comprise a MAC layer, an RLC layer, and a PDCP layer. As referred to herein, Layer 1 may comprise a PHY layer of a UE/RAN node.

EXAMPLES

Example 1 may include a new SDP attribute to indicate capabilities for carriage of 360 video as part of an RTP stream including one or more of the following: ability to carry immersive media metadata information as part of the RTP payload format, e.g., using supplemental information enhancement (SEI) messages, e.g., information carried in the omnidirectional video specific SEI messages are then to be used in the rendering phase at the receiver.

Example 2 may include a new SDP attribute to indicate viewport-dependent processing capabilities for carriage of 360 video as part of an RTP stream including one or more of the following: ability to signal desired viewport using an RTCP feedback message; and/or ability to signal the actually transmitted viewport using an RTP header extension message.

Example 3 may include SDP attribute of example 2 or some other example herein, where as a result two or more RTP streams may be negotiated.

Example 4 may include the single SDP attribute that combines the capabilities in examples 1 and 2 or some other example herein.

Example 5 may include SDP attribute of example 3 or some other example herein, where one RTP stream is for the base 360 video and another is a viewport-optimized RTP stream, with the high quality 360 video corresponding to the desired viewport.

Example 6 may include SDP attribute of example 1 or some other example herein, where the omnidirectional video specific SEI messages may contain one or more of the following: the equirectangular projection SEI message, the cubemap projection SEI message, the sphere rotation SEI message, and the region-wise packing SEI message.

Example 7 may include a method comprising: receiving an SDP offer message, the SDP offer message to indicate capabilities for support of 360 video in an RTP stream; encoding, for transmission, an SDP answer message based on the SDP offer message, the SDP answer message to indicate a confirmation of the capabilities.

Example 8 may include the method of example 7 or another example herein, wherein the SDP offer message further includes a viewport-dependent processing capability.

Example 9 may include the method of example 8 or another example herein, wherein the SDP offer message includes two or more RTP streams when the SDP answer message includes the viewport-dependent processing capability.

Example 10 may include the method of example 8-9 or another example herein, wherein the capabilities for support of 360 video and the viewport-dependent processing capability are indicated in a same SDP attribute in the SDP offer message.

Example 11 may include the method of example 8-10 or another example herein, wherein the SDP answer includes an acceptance of the viewport-dependent processing capability.

Example 12 may include the method of example 8-11 or another example herein, further comprising encoding, for transmission, immersive media including 360 video based on the SDP offer message.

Example 13 may include the method of example 8-12 or another example herein, wherein the SDP offer message is received from a UE.

Example 14 may include the method of example 8-13 or another example herein, wherein the method is performed by a conferencing server or a portion thereof.

Example 15 may include a method comprising: encoding, for transmission, an SDP offer message, the SDP offer message to indicate capabilities for support of 360 video in an RTP stream; receiving an SDP answer message based on the SDP offer message, the SDP answer message to indicate a confirmation of the capabilities.

Example 16 may include the method of example 15 or another example herein, wherein the SDP offer message further includes a viewport-dependent processing capability.

Example 17 may include the method of example 16 or another example herein, wherein the SDP offer message includes two or more RTP streams when the SDP answer message includes the viewport-dependent processing capability.

Example 18 may include the method of example 16-17 or another example herein, wherein the capabilities for support of 360 video and the viewport-dependent processing capability are indicated in a same SDP attribute in the SDP offer message.

Example 19 may include the method of example 16-18 or another example herein, wherein the SDP answer includes an acceptance of the viewport-dependent processing capability.

Example 20 may include the method of example 16-19 or another example herein, further comprising receiving immersive media including 360 video based on the SDP offer message.

Example 21 may include the method of example 16-20 or another example herein, wherein the SDP answer message is received from a conferencing server.

Example 22 may include the method of example 16-21 or another example herein, wherein the method is performed by a UE or a portion thereof.

Example 23 includes an electronic device that comprises: first circuitry to decode, based on a first real-time transport protocol (RTP) stream, first visual data related to a plurality of images concurrently taken of a location; second circuitry to decode, based on a session description protocol (SDP) offer received from a user equipment (UE), an indication that the UE supports immersive viewing capability; and third circuitry to transmit, via a second RTP stream based on the SDP offer, second visual data related to the first visual data, wherein the second visual data includes a supplemental information enhancement (SEI) message to be used to display at least a portion of the second visual data.

Example 24 include the electronic device of example 23, wherein the first RTP stream includes visual data related to two or more of the plurality of images.

Example 25 include the electronic device of example 23, wherein the first RTP stream include visual data related to an image of the plurality of images, and wherein the electronic device further comprises: fourth circuitry to decode, based on a third RTP stream, third visual data related to a another image of the plurality of images; and fifth circuitry to stitch together the first visual data and the third visual data.

Example 26 include the electronic device of any of examples 23-25, wherein the SEI message is an equirectangular projection SEI message, a cubemap projection SEI message, a sphere rotation SEI message, or a region-wise packing SEI message.

Example 27 include the electronic device of any of examples 23-25, further comprising sixth circuitry to decode, based on a RTP control protocol (RTCP) feedback message received from the UE, an indication of a desired viewing orientation of the first visual data.

Example 28 include the electronic device of example 27, wherein the second visual data is a portion of the first visual data that is based on the indication of the desired viewing orientation.

Example 29 include the electronic device of any of examples 23-25, wherein the first, second, and third circuitry are circuitry of a processor.

Example 30 includes an electronic device comprising: first circuitry to determine, based on a received real-time transport protocol (RTP) stream that includes visual data related to a plurality of images concurrently taken of a location, an elementary stream; second circuitry to decode, based on the elementary stream, the visual data and a supplemental information enhancement (SEI) message; third circuitry to generate, based on the visual data and the SEI message, a mapping of the visual data to a visual field; and fourth circuitry to output, to a display device, data related to the mapping of the visual data to the visual field.

Example 31 include the electronic device of example 30, wherein the electronic device is a user equipment (UE) of a third generation partnership project (3GPP) network, and wherein the UE includes the display device.

Example 32 include the electronic device of example 30, wherein the SEI message is an equirectangular projection SEI message, a cubemap projection SEI message, a sphere rotation SEI message, or a region-wise packing SEI message.

Example 33 include the electronic device of any of examples 30-32, further comprising fifth circuitry to facilitate transmission, in a RTP control protocol (RTCP) feedback message, an indication of a desired viewing orientation of the first visual data.

Example 34 include the electronic device of any of examples 30-32, wherein the RTP stream is a first RTP stream that includes first visual data related to a first image of the plurality of images, and wherein the elementary stream is further based on a decoded second RTP stream that includes second visual data related to a second image of the plurality of images.

Example 35 include the electronic device of any of examples 30-32, wherein the RTP stream includes visual data related to at least a first image and a second image of the plurality of images.

Example 36 include the electronic device of any of examples 30-32, wherein the visual data is a high efficiency video coding (HEVC) bitstream that includes the SEI message.

Example 37 includes a method comprising: transmitting, from a user equipment (UE) to an (IP) multimedia subsystem (IMS) server, a session description protocol (SDP) offer that includes an indication that the UE supports immersive video; determining, by the UE based on a SDP response received from the server, an indication that server supports immersive video; determining, based on the SDP offer and the SDP response, a real-time transport protocol (RTP) media flow that includes visual data related to a plurality of images concurrently taken of a location and a supplemental information enhancement (SEI) message that is to be used to display at least a portion of the visual data; and visually displaying, by the UE based on the visual data and the SEI message, the portion of the visual data to a user of the user device.

Example 38 include the method of example 37, wherein the SDP offer includes an indication that the UE supports viewport-dependent processing.

Example 39 include the method of example 37, wherein the SDP response includes an indication that the server supports viewport-dependent processing.

Example 40 include the method of any of examples 37-39, further comprising transmitting, from the UE to the server in a RTP control protocol (RTCP) feedback message, an indication of a desired field of view of the visual data.

Example 41 include the method of example 40, wherein the visual data of the RTP media flow is based on the indication of the desired field of view.

Example 42 include the method of any of examples 37-39, wherein the visual data is based on an Omnidirectional Media Format (OMAF) video profile.

Example 43 may include an apparatus comprising means to perform one or more elements of a method described in or related to any of examples 1-42, or any other method or process described herein.

Example 44 may include one or more non-transitory computer-readable media comprising instructions to cause an electronic device, upon execution of the instructions by one or more processors of the electronic device, to perform one or more elements of a method described in or related to any of examples 1-42, or any other method or process described herein.

Example 45 may include an apparatus comprising logic, modules, or circuitry to perform one or more elements of a method described in or related to any of examples 1-42, or any other method or process described herein.

Example 46 may include a method, technique, or process as described in or related to any of examples 1-42, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of examples 1-42, or portions thereof.

Example 48 may include a signal as described in or related to any of examples 1-42, or portions or parts thereof.

Example 49 may include a datagram, packet, frame, segment, protocol data unit (PDU), or message as described in or related to any of examples 1-42, or portions or parts thereof, or otherwise described in the present disclosure.

Example 50 may include a signal encoded with data as described in or related to any of examples 1-42, or portions or parts thereof, or otherwise described in the present disclosure.

Example 51 may include a signal encoded with a datagram, packet, frame, segment, PDU, or message as described in or related to any of examples 1-42, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of examples 1-42, or portions thereof.

Example 53 may include a computer program comprising instructions, wherein execution of the program by a processing element is to cause the processing element to carry out the method, techniques, or process as described in or related to any of examples 1-42, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus comprising:
   first circuitry to determine, based on a received real-time transport protocol (RTP) stream that includes visual data related to a plurality of images concurrently taken of a location, an elementary stream;
   second circuitry to decode, based on the elementary stream, the visual data and a supplemental enhancement information (SEI) message;
   third circuitry to generate, based on the visual data and the SEI message, a mapping of the visual data to a visual field; and
   fourth circuitry to output, to a display device, data related to the mapping of the visual data to the visual field.

2. The apparatus of claim 1, wherein the apparatus comprises a user equipment (UE) of a third generation partnership project (3GPP) network, and wherein the UE includes the display device.

3. The apparatus of claim 1, wherein the SEI message is an equirectangular projection SEI message, a cubemap projection SEI message, a sphere rotation SEI message, or a region-wise packing SEI message.

4. The apparatus of claim 1, further comprising fifth circuitry to facilitate transmission, in a RTP control protocol (RTCP) feedback message, an indication of a desired viewing orientation of the visual data.

5. The apparatus of claim 4, wherein the visual data is based on the indication of the desired viewing orientation.

6. The apparatus of claim 1, wherein the RTP stream is a first RTP stream that includes first visual data related to a first image of the plurality of images, and wherein the elementary stream is further based on a decoded second RTP stream that includes second visual data related to a second image of the plurality of images.

7. The apparatus of claim 1, wherein the RTP stream includes visual data related to at least a first image and a second image of the plurality of images.

8. The apparatus of claim 1, wherein the visual data is a high efficiency video coding (HEVC) bitstream that includes the SEI message.

9. The apparatus of claim 1, wherein the first circuitry determines, based on the received real-time transport protocol (RTP) stream i) for a video conference between two or more devices that include the apparatus and ii) that includes the visual data related to the plurality of images concurrently taken of the location, the elementary stream.

10. The apparatus of claim 1, wherein the visual data is based on an Omnidirectional Media Format (OMAF) video profile.

11. A method comprising:
    obtaining, based on a received real-time transport protocol (RTP) stream that includes visual data related to a plurality of images a for a video conference between two or more devices, the visual data and a supplemental enhancement information (SEI) message;
    generating, based on the visual data and the SEI message, a mapping of the visual data to a visual field; and
    outputting, to a display device, data related to the mapping of the visual data to the visual field.

12. The method of claim 11, wherein obtaining the visual data and the SEI message comprises obtaining, by one or more baseband processors, the visual data and the SEI message.

13. The method of claim 11, wherein the SEI message is an equirectangular projection SEI message, a cubemap projection SEI message, a sphere rotation SEI message, or a region-wise packing SEI message.

14. The method of claim 11, comprising transmitting, in a RTP control protocol (RTCP) feedback message, an indication of a desired viewing orientation of the visual data.

15. The method of claim 14, wherein the visual data is based on the indication of the desired viewing orientation.

16. The method of claim 11, wherein:
the RTP stream is a first RTP stream that includes first visual data related to a first image of the plurality of images; and
obtaining the visual data and the SEI message comprises obtaining the visual data and the SEI message based on the first RTP stream and a second RTP stream that includes second visual data related to a second image of the plurality of images.

17. The method of claim 11, wherein the RTP stream includes visual data related to at least a first image and a second image of the plurality of images.

18. The method of claim 11, wherein the visual data is a high efficiency video coding (HEVC) bitstream that includes the SEI message.

19. The method of claim 11, wherein the plurality of images were substantially concurrently taken of a location.

20. The method of claim 11, wherein the visual data is based on an Omnidirectional Media Format (OMAF) video profile.

\* \* \* \* \*

UNITED STATES PATENT AND TRADEMARK OFFICE
CERTIFICATE OF CORRECTION

PATENT NO. : 11,652,862 B2
APPLICATION NO. : 17/892019
DATED : May 16, 2023
INVENTOR(S) : Ozgur Oyman Page 1 of 1

It is certified that error appears in the above-identified patent and that said Letters Patent is hereby corrected as shown below:

On the Title Page

Item (57) (Abstract), Line 5, Delete "information enhancement" and insert -- enhancement information --; and In the Claims Column 30, Line 48, Claim 11, replace "plurality of images a for a video" with -- plurality of images for a video --.

Signed and Sealed this
Twenty-sixth Day of September, 2023

Katherine Kelly Vidal
*Director of the United States Patent and Trademark Office*